United States Patent [19]

Lauk

[11] Patent Number: 5,225,545

[45] Date of Patent: Jul. 6, 1993

[54] DISAZO DYES CONTAINING A 1-HYDROXY-3-SULFO-ACYLAMINOPHENYL-AMINO-NAPHTHALENE COUPLING COMPONENT

[75] Inventor: Urs Lauk, Zurich, Switzerland

[73] Assignee: Ciba-Geigy Corporation, Ardsley, N.Y.

[21] Appl. No.: 881,580

[22] Filed: May 12, 1992

[30] Foreign Application Priority Data

May 15, 1991 [CH] Switzerland .......................... 1451/91

[51] Int. Cl.$^5$ .................... C09B 31/08; D06P 3/87; C09D 11/02
[52] U.S. Cl. .................... 534/829; 534/591; 534/599; 534/732; 534/796; 534/797; 534/806; 546/313; 546/316; 549/72; 558/234; 560/10; 562/47; 106/23; 8/532
[58] Field of Search ............ 534/591, 599, 732, 796, 534/797, 806, 829; 8/532

[56] References Cited

U.S. PATENT DOCUMENTS

| 1,850,547 | 3/1932 | Heintrich et al. ............ 534/591 X |
|---|---|---|
| 2,070,997 | 2/1937 | Misslin et al. ............ 534/599 X |
| 2,670,346 | 2/1954 | Bossard et al. ............ 534/732 |
| 2,714,588 | 8/1955 | Keller ............ 534/732 X |

FOREIGN PATENT DOCUMENTS

| 0097289 | 1/1984 | European Pat. Off. . |
|---|---|---|
| 0198102 | 12/1906 | Fed. Rep. of Germany . |
| 0747026 | 9/1944 | Fed. Rep. of Germany . |
| 294233 | 1/1954 | Switzerland ............ 534/732 |
| 294234 | 1/1954 | Switzerland ............ 534/732 |

OTHER PUBLICATIONS

Derwent Abstract No. 89-237981 (1987).
Chem. Abst. 112:57805b (1990).

Primary Examiner—Mary C. Lee
Assistant Examiner—Fiona T. Powers
Attorney, Agent, or Firm—Marla J. Mathias; Edward McC. Roberts

[57] ABSTRACT

The compounds of the formula (1) indicated in claim 1 are suitable for use as direct dyes for dyeing and printing a wide range of materials, in particular cellulose-containing fibre materials, producing dyeings and prints having good fastness properties.

18 Claims, No Drawings

DISAZO DYES CONTAINING A 1-HYDROXY-3-SULFO-ACYLAMINOPHENYL-AMINO-NAPHTHALENE COUPLING COMPONENT

The present invention relates to novel azo dyes, processes for the preparation thereof and the use thereof for dyeing and printing fibre materials, in particular textile fibre materials.

The present invention provides compounds of the formula

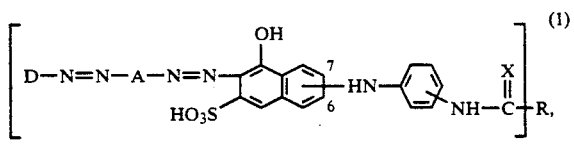

where
D is an 8-hydroxy-1-naphthyl radical which is substituted by 1 or 2 sulfo groups,
A is a radical of the formula

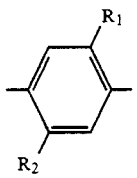

or of the formula

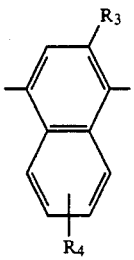

where $R_1$ and $R_2$ are each independently of one another hydrogen, $C_1$–$C_4$alkyl, unsubstituted or hydroxyl-substituted (in the alkyl moiety) $C_1$–$C_4$alkoxy or $C_2$–$C_4$alkanoylamino, unsubstituted or $C_1$–$C_4$alkyl-, $C_1$–$C_4$alkoxy- or halogen-substituted benzoylamino or ureido, $R_3$ is hydrogen, $C_1$–$C_4$alkyl or $C_1$–$C_4$alkoxy, and $R_4$ is hydrogen or sulfo,
and the phenylene radical (B) is unsubstituted or halogen-, $C_1$–$C_4$alkyl- or $C_1$–$C_4$alkoxy-substituted,
X is S or O,
n is 1 or 2, and
R, for n being 1, is substituted or unsubstituted alkyl, alkoxy, cycloalkyl, alkenyl, aryl, aralkyl or hetaryl or, for n being 2, is substituted or unsubstituted alkylene, cycloalkylene, alkenylene, arylene, aralkylene or heterocyclylene.

Examples of suitable 8-hydroxy-1-naphthyl radicals D are:
8-hydroxy-3,6-disulfo-1-naphthyl,
8-hydroxy-4,6-disulfo-1-naphthyl,
8-hydroxy-2,4-disulfo-1-naphthyl,
8-hydroxy-3,5-disulfo-1-naphthyl,
8-hydroxy-4,7-disulfo-1-naphthyl,
8-hydroxy-5,7-disulfo-1-naphthyl,
8-hydroxy-4-sulfo-1-naphthyl,
8-hydroxy-5-sulfo-1-naphthyl, and
8-hydroxy-6-sulfo-1-naphthyl.

D is preferably 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, particularly preferably 8-hydroxy-3,6-disulfo-1-naphthyl.

The term sulfo encompasses in general not only the free acid form (—$SO_3H$) but also the salt form, for which in particular alkali metal salts (Li, Na, K) or ammonium salts come into consideration.

Any $C_1$–$C_4$alkyl represented by $R_1$, $R_2$ or one of the variables mentioned hereinafter comprises methyl, ethyl, n-propyl, isopropyl, n-butyl, isobutyl, sec-butyl or tert-butyl, preferably methyl or ethyl, particularly preferably methyl.

Any $C_1$–$C_4$alkoxy represented by $R_1$, $R_2$ or one of the variables mentioned hereinafter comprises in general methoxy, ethoxy, n-propoxy, isopropoxy, n-butoxy, isobutoxy, sec-butoxy or tert-butoxy, preferably methoxy or ethoxy, particularly preferably methoxy. Other possibilities for $R_1$ and $R_2$ are the radicals with hydroxyl substitution in the alkyl moiety.

Any $C_2$–$C_4$alkanoylamino radical represented by $R_1$, $R_2$ or one of the variables mentioned hereinafter comprises for example an unsubstituted or hydroxyl-substituted acetylamino, propionylamino or butyrylamino radical, preferably an unsubstituted or hydroxyl-substituted $C_2$–$C_3$alkanoylamino radical. Examples of suitable alkanoylamino radicals $R_1$ and $R_2$ are acetylamino, n-propionylamino, isopropionylamino, hydroxyacetylamino and 2- or 3-hydroxy-n-propionylamino, of which acetylamino is particularly preferred.

Examples of suitable halogen substituents are in general bromine, fluorine and in particular chlorine.

Substituted or unsubstituted benzoylamino $R_1$ or $R_2$ is preferably unsubstituted or, for example, methyl-, methoxy- or chlorine-substituted benzoylamino, particularly preferably unsubstituted benzoylamino.

$R_1$ and $R_2$ are each preferably independently of one another hydrogen, methyl, ethyl, methoxy, ethoxy, acetylamino, hydroxyacetylamino, n-propionylamino, benzoylamino or ureido, particularly preferably hydrogen, methyl, methoxy, acetylamino or ureido. Another preferred meaning for $R_1$ and $R_2$ is β-hydroxyethyl.

Particularly preferred meanings for $R_1$ are methyl and methoxy and for $R_2$ hydrogen, methyl, methoxy, acetylamino and ureido.

A radical A of the formula (2) is derived particularly preferably from one of the following middle components:
1-amino-2-methoxy-5-methylbenzene,
1-amino-2,5-dimethylbenzene,
1-amino-2-methoxy-5-acetylaminobenzene,
1-amino-2-methoxybenzene,
1-amino-2-methylbenzene,
1-amino-2,5-dimethoxybenzene,
1-amino-2-methyl-5-acetylaminobenzene,
1-amino-2-methoxy-5-ureidobenzene,
1-amino-2-methyl-5-ureidobenzene,
1-amino-3-methoxybenzene,
1-amino-3-methylbenzene,
1-amino-2-(2'-hydroxyethoxy)-5-methylbenzene.

$R_3$ is preferably hydrogen, methyl, ethyl, methoxy or ethoxy, particularly preferably hydrogen, methyl or methoxy.

$R_4$ is preferably sulfo.

A radical A of the formula (3) is particularly preferably derived from
1-aminonaphthalene-6-, -7- or -8-sulfonic acid or
1-amino-2-methoxynaphthalene-6-sulfonic acid as middle component.

A particularly preferred embodiment of the present invention concerns compounds of the aforementioned formula (1) where A is the radical of
1-amino-2-methoxy-5-methylbenzene.

The component from which the naphthalene radical is derived is for example 1-hydroxy-3-sulfo-7-aminonaphthalene ($\gamma$-acid) or preferably 1-hydroxy-3-sulfo-6-aminonaphthalene (I-acid); that is, the amino radical is attached to the naphthalene radical for example in the 7-position or preferably in the 6-position.

B is preferably an unsubstituted or chlorine-, methyl-, ethyl-, methoxy- or ethoxy-substituted phenylene radical, preferably an unsubstituted or chlorine-, methyl- or methoxy-substituted 1,3- or 1,4-phenylene radical, particularly preferably 1,4-phenylene.

X is preferably O.

The bracketed radical in the formula (1) is preferably a radical of the formula

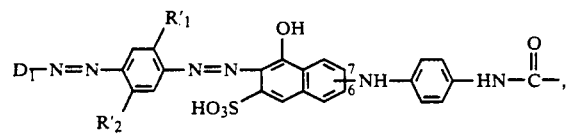

where $D_1$ is 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, $R'_1$ is methyl or methoxy and $R'_2$ is hydrogen, methyl, methoxy, acetylamino or ureido, particularly preferably the radical of the formula

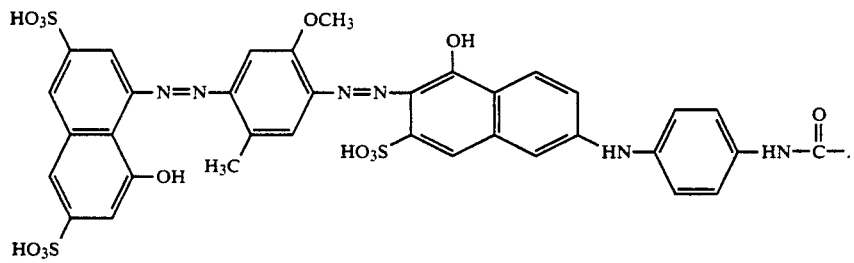

Substituted or unsubstituted alkyl R is for example substituted or unsubstituted $C_1$-$C_6$alkyl. Examples are methyl, ethyl, n-propyl, isopropyl, n-butyl, isobutyl, sec-butyl, tert-butyl, and a straight-chain or branched pentyl or hexyl radical, which may be substituted for example by $C_1$-$C_4$alkoxy, cyano, halogen, $C_1$-$C_4$alkoxycarbonyl, e.g. methoxy- or ethoxy-carbonyl, $C_2$-$C_5$alkanoyloxy, e.g. acetoxy, propionyloxy, or carbamoyl and/or, except for methyl, may be interrupted by a group —O—, —S— or —N(CH$_3$)—.

Examples of suitable alkyl R are methyl, ethyl, n-propyl, isopropyl, n-butyl, isobutyl, sec-butyl, or tert-butyl, $\beta$-chloroethyl, $\beta$-cyanoethyl and $\beta$-acetoxyethyl.

Alkyl R is preferably unsubstituted or for example chlorine-, cyano- or acetoxy-substituted and/or, except for methyl, optionally oxygen-interrupted $C_1$-$C_4$alkyl.

Particularly preferred alkyl R is unsubstituted $C_1$-$C_4$alkyl, in particular methyl and ethyl.

Substituted or unsubstituted alkoxy R is for example $C_1$-$C_4$alkoxy, such as methoxy, ethoxy, n-propoxy, isopropoxy, n-butoxy, isobutoxy, sec-butoxy or tert-butoxy, preferably methoxy or ethoxy, particularly preferably methoxy. The radicals mentioned may be unsubstituted or for example hydroxy-substituted.

Substituted or unsubstituted cycloalkyl R is for example substituted or unsubstituted $C_5$-$C_9$cycloalkyl, preferably cyclopentyl or cyclohexyl, which is unsubstituted or for example $C_1$-$C_4$alkyl-, $C_2$-$C_5$alkanoylamino-, for example acetylamino- or n-propionylamino-, or benzoylamino-substituted.

Cycloalkyl R is particularly preferably unsubstituted or methyl-monosubstituted, -disubstituted or -trisubstituted cyclopentyl or cyclohexyl and in particular cyclohexyl.

Substituted or unsubstituted alkenyl R is for example phenylvinyl.

Aryl R is for example unsubstituted or for example nitro-, halogen-, for example fluorine-, chlorine- or bromine-, cyano-, $C_1$-$C_4$alkyl-, $C_1$-$C_4$alkoxy-, phenoxy-, N,N-di-$C_1$-$C_4$alkylamino-, $C_2$-$C_4$alkanoylamino-, benzoylamino-, $C_1$-$C_4$alkoxycarbonyl-, carbamoyl-, sulfamoyl- and/or $C_1$-$C_4$alkylsulfonyl-substituted phenyl or naphthyl.

Preferred aryl R is unsubstituted or nitro-, fluorine-, chlorine-, bromine-, methyl-, methoxy-, N,N-dimethylamino-, N,N-diethylamino-, acetylamino-, propionylamino-, benzoylamino-, methoxycarbonyl-, ethoxycarbonyl- or methylsulfonyl-substituted phenyl or unsubstituted or nitro- or chlorine-substituted 1- or 2-naphthyl.

Particularly preferred aryl R is an unsubstituted or chlorine-, nitro-, methyl- and/or methoxy-substituted phenyl radical or an unsubstituted 1- or 2-naphthyl radical.

Very particularly preferred meanings of aryl R are phenyl, o-, m- and p-chlorophenyl and 1- and 2-naphthyl.

Aralkyl R is for example substituted or unsubstituted $C_7$-$C_{12}$aralkyl and preferably a benzyl or phenylethyl radical which may be further substituted by for example $C_1$-$C_4$alkyl, nitro, halogen or $C_1$-$C_4$alkoxy. Aralkyl R is particularly preferably unsubstituted or for example methyl-, chlorine- and/or methoxy-substituted benzyl and is very particularly preferably benzyl.

Examples of suitable hetaryl R are 2-thiophenyl, 2-furanyl and 2-, 3- and 4-pyridinyl.

In the case of n being 1, R is preferably $C_1$-$C_4$alkyl, $C_1$-$C_4$alkoxy, unsubstituted or methyl-monosubstituted, -disubstituted or -trisubstituted cyclopentyl or cyclohexyl, unsubstituted or nitro-, chlorine-, bromine-, methyl-, methoxy-, N,N-dimethylamino-, N,N-diethylamino-, acetylamino-, propionylamino-, benzoylamino-, methoxycarbonyl-, ethoxycarbonyl- or methylsulfonyl-substituted phenyl, unsubstituted or nitro- or chlorine-substituted 1- or 2-naphthyl, unsubstituted or methyl-, methoxy- and/or chlorine-substituted benzyl, or 2-thiophenyl, 2-furanyl or 2-, 3- or 4-pyridinyl.

In the case of n being 1, R is particularly preferably methyl, ethyl, unsubstituted or nitro-, chlorine-, methyl- and/or methoxy-substituted phenyl, 2-thiophenyl, benzyl or 1- or 2-naphthyl or particularly preferably o-, m- or p-chlorophenyl or 1- or 2-naphthyl.

Substituted or unsubstituted alkylene R is for example substituted or unsubstituted $C_2$-$C_6$alkylene and preferably an unsubstituted $C_2$-$C_6$alkylene radical or a $C_2$-$C_6$alkylene radical which is substituted for example by $C_1$-$C_4$alkoxy, cyano, halogen, phenyl or $C_1$-$C_4$alkoxycarbonyl and/or uninterrupted or interrupted by 1–2 groups comprising —O—, —N($R_5$)—, where $R_5$ is $C_1$-$C_4$alkyl or acetyl, —S—, —$SO_2$— or a cycloaliphatic or heterocyclic-aliphatic radical.

Examples of suitable alkylene R are 1,2-ethylene, 1,2- and 1,3-propylene, 1-ethyl-1,2-ethylene, 1- and 2-phenyl-1,3-propylene, 1,4-, 2,3- and 2,4-butylene, 1,2-dimethyl-1,2-ethylene, 1-phenyl-1,2-ethylene, 2-methyl-1,3-propylene, 2,2-dimethyl-1,3-propylene, 1-chloro-2,3-propylene, 1,5- and 2,4-pentylene, 2-methyl-2,4-pentylene, 2,3-diphenyl-1,4-butylene, 1-methoxycarbonyl-1,5-pentylene, 1,6-and 2,5-hexylene, 2-carboxy-1,3-propylene, 2-methoxy-1,3-propylene, a radical of the formula —$CH_2$—$CH_2$—Q—$CH_2$—$CH_2$—, where Q is —O—, —S—, —$SO_2$— or —N($CH_3$)—, or a radical of the formula

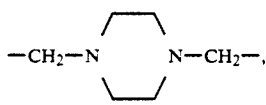

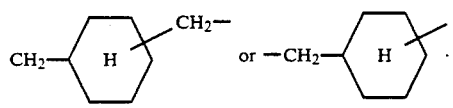

Alkylene R is particularly preferably an unsubstituted or methoxy-substituted $C_2$-$C_4$alkylene radical and very particularly preferably 1,2-ethylene or 1,2- or 1,3-propylene.

Substituted or unsubstituted cycloalkylene R is for example substituted or unsubstituted $C_5$-$C_9$cycloalkylene and preferably unsubstituted or $C_1$-$C_3$alkyl-monosubstituted or -polysubstituted cyclopentylene or cyclohexylene; under this meaning R is particularly preferably unsubstituted or methyl-monosubstituted, -disubstituted or -trisubstituted cyclohexylene.

Examples of suitable cycloaliphatic radicals R are: 1,3- and 1,4-cyclohexylene, 4-methyl-1,3-cyclohexylene, 2-methyl-1,3-cyclohexylene, 5,5-dimethyl-1,3-cyclohexylene, 2-methyl-1,4-cyclohexylene, 4,6-dimethyl-1,3-cyclohexylene and 4-methyl-1,2-cyclohexylene.

Alkenylene R is for example —CH=CH— with trans-disposed hydrogen atoms.

Arylene R is for example an unsubstituted or for example $C_1$-$C_4$alkyl-, $C_1$-$C_4$alkoxy-and/or halogen-substituted phenylene, biphenylene or naphthylene radical.

Examples of suitable arylene R are 1,3- and 1,4-phenylene, 2-methyl-1,4-phenylene, 2-methoxy-1,4-phenylene, 1,4-naphthylene and 1,1'-biphenyl-4,4'-diyl.

Preferred arylene R is an unsubstituted or methyl- or methoxy-substituted 1,3- or 1,4-phenylene radical or an unsubstituted naphthylene radical.

Particularly preferred arylene R is unsubstituted 1,2- or 1,4-phenylene.

Substituted or unsubstituted aralkylene R is for example a $C_1$-$C_6$alkylene-phenylene, a phenylene-$C_1$-$C_6$alkylene-phenylene, a $C_1$-$C_3$alkylene-phenylene-$C_1$-$C_3$alkylene or a methylene-naphthylene-methylene radical, in each of which aralkylene radicals the alkylene may be substituted as indicated above and/or interrupted by one of the aforementioned hetero groups and the phenylene and naphthylene may additionally carry 1 or 2 substituents selected from the group consisting of sulfamoyl, carbamoyl, methyl, ethyl, methoxy, ethoxy, nitro, chlorine, N,N-dimethylamino, N,N-diethylamino and phenylamino.

Examples of suitable aralkylene R are

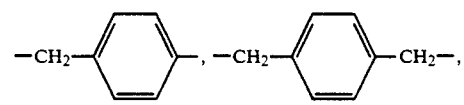

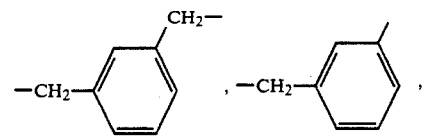

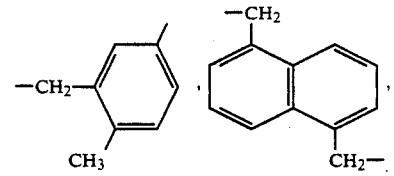

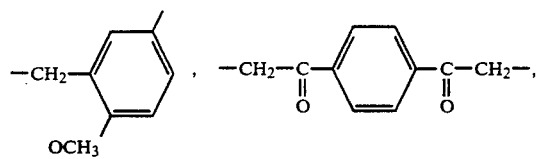

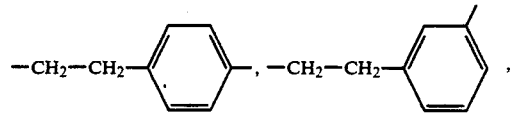

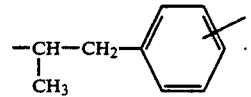

Preferred aralkylene R is a $C_1$-$C_3$alkylene-phenylene or $C_1$-$C_2$alkylene-phenylene-$C_1$-$C_2$alkylene radical which in the phenyl moiety is unsubstituted or for example methyl-, methoxy- or chlorine-substituted.

Heterocyclylene R is for example 1,4-piperazinediyl, 2,5-furandiyl or 2,5-thiophenediyl.

In the case of n being 2, R is preferably an unsubstituted or methoxy-substituted $C_2$-$C_4$alkylene radical, an unsubstituted or methyl-monosubstituted, -disubstituted or -trisubstituted cyclohexylene radical, trans-CH=CH—, an unsubstituted or methyl- or methoxy-substituted 1,3- or 1,4-phenylene radical, a $C_1$-$C_2$alkylene-phenylene or $C_1$-$C_2$alkylene-phenylene-$C_1$-$C_2$alkylene radical where phenylene is in each case unsubstituted or methyl-, methoxy- or chlorine-substituted, or 1,4-piperazinediyl, 2,5-furandiyl or 2,5-thiophenediyl.

In the case of n being 2, R is particularly preferably 1,3- or 1,4-phenylene, 1,4-piperazinediyl, 2,5-thiophenediyl or trans-CH=CH—.

Of importance because of their good dyeing properties are compounds of the aforementioned formula (1) where D is 8-hydroxy-3,6-disulfo-1-naphthyl, 8-hydroxy-4,6-disulfo-1-naphthyl, 8-hydroxy-2,4-disulfo-1-naphthyl, 8-hydroxy-3,5-disulfo-1-naphthyl, 8-hydroxy-4,7-disulfo-1-naphthyl, 8-hydroxy-5,7-disulfo-1-naphthyl, 8-hydroxy-4-sulfo-1-naphthyl, 8-hydroxy-5-sulfo-1-naphthyl or 8-hydroxy-6-sulfo-1-naphthyl, A is a radical of the aforementioned formula (2) where $R_1$ and $R_2$ are each independently of one another hydrogen, methyl, ethyl, methoxy, ethoxy, acetylamino, hydroxyacetylamino, n-propionylamino, benzoylamino or ureido or a radical of the aforementioned formula (3) where $R_3$ is hydrogen, methyl or methoxy and $R_4$ is sulfo, B is unsubstituted or chlorine-, methyl-, ethyl-, methoxy-, or ethoxy-substituted phenylene, X is O and n is 1 or 2 and where R, for n being 1, is $C_1$-$C_4$alkyl, $C_1$-$C_4$alkoxy, unsubstituted or methyl-monosubstituted, -disubstituted or -trisubstituted cyclopentyl or cyclohexyl, unsubstituted or nitro-, chlorine-, bromine-, methyl-, methoxy-, N,N-dimethylamino-, N,N-diethylamino-, acetylamino-, propionylamino-, benzoylamino-, methoxycarbonyl-, ethoxycarbonyl- or methylsulfonyl-substituted phenyl, unsubstituted or nitro-or chlorine-substituted 1- or 2-naphthyl, unsubstituted or methyl-, methoxy- and/or chlorine-substituted benzyl, or 2-thiophenyl, 2-furanyl or 2-, 3- or 4-pyridinyl, or, for n being 2, is an unsubtituted or methoxy-substituted $C_2$-$C_4$alkylene radical, an unsubstituted or methyl-monosubstituted, -disubstituted or -trisubstituted cyclohexylene radical, trans-CH=CH—, an unsubstituted or methyl- or methoxy-substituted 1,3- or 1,4-phenylene radical, a $C_1$-$C_3$alkylene-phenylene or $C_1$-$C_2$alkylene-phenylene-$C_1$-$C_2$alkylene radical where phenylene is in each case unsubstituted or methyl-, methoxy- or chlorine-substituted, or 1,4-piperazinediyl, 2,5-furandiyl or 2,5-thiophenediyl.

Of particular importance because of their good dyeing properties are compounds of the formula

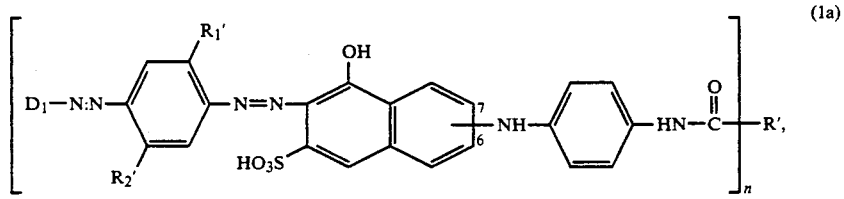

(1a)

where $D_1$ is 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, $R'_1$ is methyl or methoxy, $R'_2$ is hydrogen, methyl, methoxy, acetylamino or ureido, and n is 1 or 2 and where R', for n being 1, is methyl, ethyl, unsubstituted or nitro-, chlorine-, methyl- and/or methoxy-substituted phenyl, 2-thiophenyl, benzyl or 1- or 2-naphthyl or, for n being 2, is 1,3- or 1,4-phenylene, 2,5-thiophenediyl, 1,4-piperazinediyl or trans-CH=CH—.

A particularly preferred embodiment of the present invention concerns compounds of the formula

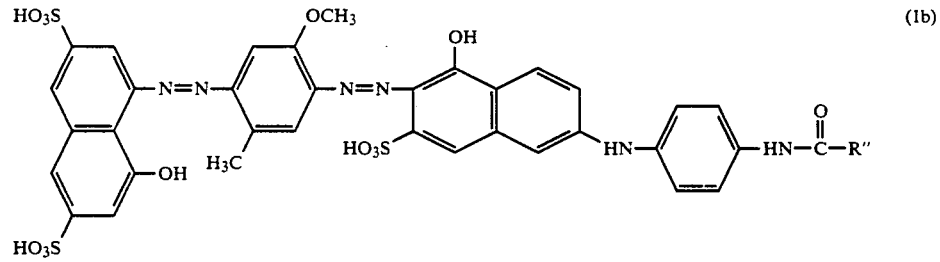

(1b)

where R" is phenyl, o-, m- or p-chlorophenyl or 1- or 2-naphthyl.

The compounds of formula (1) can be obtained for example by diazotising a compound of the formula

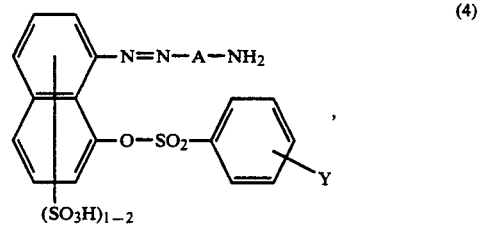

(4)

coupling with a compound of the formula

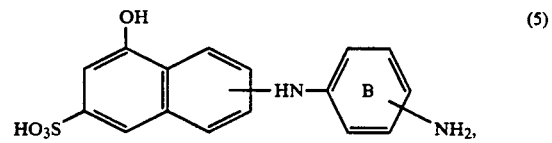

(5)

hydrolysing the resulting disazo product of the formula

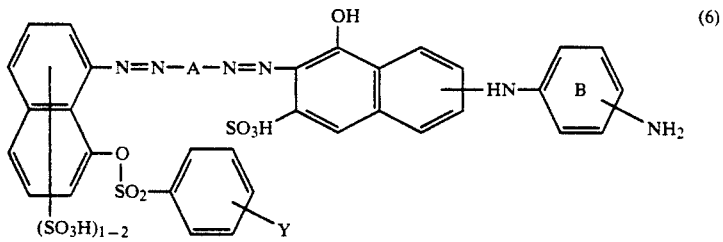

and then reacting with a compound of the formula

where A, B, R, X and n are each as defined above, Y is hydrogen, $C_1$-$C_4$alkyl or halogen, and Hal is halogen, preferably chlorine.

The compounds of the formulae (4), (5) and (6) are known or are obtainable in a known manner.

The diazotisation of the compound of the formula (4) is effected in a manner known per se, for example with a nitrite, for example with an alkali metal nitrite such as sodium nitrite, in a mineral acid medium, for example in a hydrochloric acid medium, at temperatures of $-5°$ to $30°$ C., preferably $0°$ to $10°$ C.

The coupling of the diazotised compound of the formula (4) with the compound of the formula (5) is likewise carried out under customary conditions known per se. It is advantageous to use a slightly acid, neutral or alkaline pH and temperatures of about $-5°$ to $30°$ C., preferably $0°$ to $15°$ C., in aqueous or aqueous-organic medium. Preference is given for the coupling reaction to a neutral or alkali medium which has a pH of for example 7 to 12; the pH can be set and stabilised by the addition of bases, for example alkali metal hydroxides, carbonates or acetates such as lithium, sodium or potassium hydroxide or carbonate, sodium acetate, etc., ammonia or organic amines.

The compounds of the formulae (4) and (5) are in general used in the process in substantially stoichiometric amounts.

Similarly, the hydrolysis of the compound of the formula (6) to obtain the corresponding hydroxy compound is effected in a manner known per se, advantageously by heating in an aqueous-alkali medium, for example by mixing the crude solution of the compound of the formula (6) with one of the aforementioned bases, for example with sodium or potassium hydroxide, and heating to a temperature of for example $20°$ to $150°$ C., preferably $30°$ to $100°$ C.

The reaction of the hydrolysed compound of the formula (6) with the compound of the formula (7) is advantageously carried out in an aqueous or aqueous-organic medium at a temperature of for example $0°$ to $100°$ C., preferably $20°$ to $80°$ C. It is advantageous to employ a slightly alkaline, neutral or slightly acid pH value, for example a pH of about 4.5 to 9, preferably 5.5 to 7.5; the pH can be set and kept constant during the reaction by the controlled addition of one of the aforementioned bases.

In the case of n being 1, the compounds of the formulae (6) and (7) are reacted in substantially stoichiometric amounts; a certain excess of the compound of the formula (7) is advantageous.

In the case of n being 2, in general at least 2 mole equivalents of the compound of the formula (6) are used per mole equivalent of the compound of the formula (7), a certain excess of compound of the formula (6) being advantageous.

An alternative process for preparing the compound of the formula (1) comprises reversing the above-described reaction sequence and first reacting the compound of the formula (6) with the compound of the formula (7) and then hydrolysing.

A further process for preparing the compounds of the formula (1) comprises diazotising the compound of the formula (4) as described above, coupling with a compound of the formula

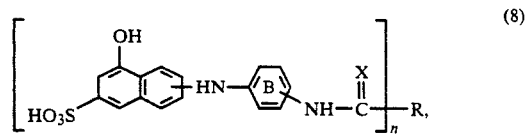

where B, R, X and n are each as defined above, in a manner known per se, and thereafter hydrolysing the phenylsulfonyl radical in the aforementioned manner.

The compounds of the formula (8) with the exception of those of the formulae

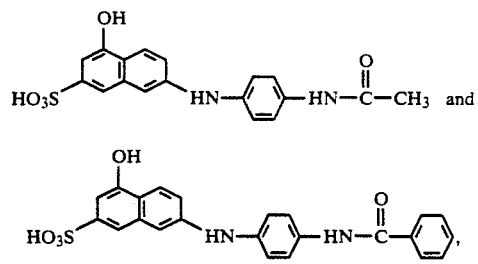

are novel and form a further part of the subject-matter of the invention.

The invention also provides for the use of the compounds of the formula (1) as dyes for dyeing or printing nitrogen-containing and in particular hydroxyl-containing fibre materials.

The compounds of the formula (1) according to the present invention are thus suitable for dyeing and printing nitrogen-containing or in particular cellulosic fibre materials, preferably textile fibre materials, made of silk, wool or synthetic polyamides, and also preferably made of cellulosic fibres, such as rayon, cotton or hemp.

In terms of their dyeing properties they can be classified in Colour Index terms as direct dyes.

It is also possible to dye textile fibre materials made of blend fibres, for example wool-cotton, polyamide-cotton, acrylic-cotton or in particular polyester-cotton blend fibres, by single-bath dyeing processes and in the presence of dyes for the other fibre type.

The textile fibre materials can be present in a wide range of processing states, for example as fibre, yarn, woven fabric or knitted fabric. The dyes and dye mixtures according to the present invention can also be used for dyeing leather and paper, as well as textile substrates.

The dyeings obtained have level blue shades and good general use fastness properties, for example good dry-rub, wet, wet-rub and perspiration fastness properties. Of particular note is the good light fastness of the dyeings obtainable with the dyes according to the present invention; the dyes of the formula (1) are also characterised by a high degree of exhaustion and good build-up. If necessary, the wet fastness properties, in particular the wash fastness, of the resulting direct dyeings and prints can be increased still further by an aftertreatment with fixing agents.

The dyes according to the present invention are highly compatible with other dyes, in particular disperse dyes. The dyes according to the present invention possess adequate high-temperature stability and are thus dyeable under the dyeing conditions for polyester fibres, i.e. at temperatures within the range from about 100° to 150° C., preferably from 100° to 130° C., from an aqueous liquor and at a pH of 4 to 7.5, preferably 5 to 7.

This makes it possible to use customary disperse dyes together with the dyes according to the present invention in a single-stage, single-bath process for dyeing polyester-cotton fibre blends or blend fabrics, obtaining uniform and fast dyeings on the two fibre portions with the respective dye. If a disperse dye of the same shade as the dye or dye mixture according to the present invention is used, it is even possible to obtain on-tone dyeings.

The dyes according to the present invention significantly simplify the dyeing of textile fibre blends of blend fabrics, for example those in polyester and cellulose fibres. It is accordingly no longer necessary to dye each component of the fibre blend separately under different dyeing conditions.

The compounds of the formula (1) according to the present invention are also suitable for preparing aqueous inks for ink-jet printing.

The examples which follow serve to illustrate the invention. Parts and percentages are by weight, unless otherwise stated. Parts by weight bear the same relation to parts by volume as the kilogram to the liter. The temperatures are given in degrees Celsius.

EXAMPLE 1

157 parts of the compound of the formula

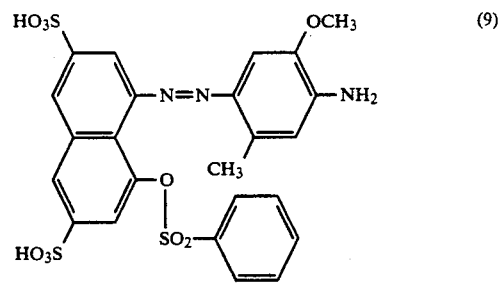

are diazotised with sodium nitrite and hydrochloric acid in a conventional manner and the resulting diazo suspension is added dropwise at 0° to 5° C. to a suspension of 82 parts of 6-(4'-aminophenylamino)-1-hydroxynaphthalene-3-sulfonic acid in 1000 parts of water in the course of about 30 minutes, during which the coupling pH is kept constant at about 8.5 by the addition of sodium hydroxide solution. The reaction mixture is stirred at pH 8.5 for about 8 to 15 hours and then brought to pH 12 to 13 with sodium hydroxide solution. The reaction mixture is then stirred at a temperature of 85° to 90° C. for about 2.5 hours and then cooled down to room temperature, and the resulting solution is adjusted to pH 6.5 to 7 with concentrated HCl. The compound of the formula

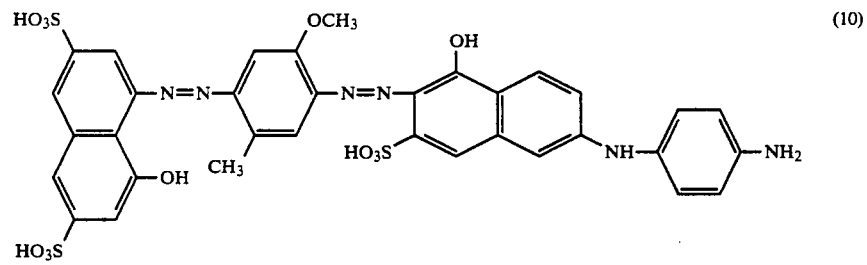

is then salted out with sodium chloride, filtered off and dried.

EXAMPLE 2

81 parts of the compound of the formula (10) obtained in Example 1 are dissolved in 6000 parts of hot water. After cooling to room temperature, 20 parts of 3-chlorobenzoyl chloride are added dropwise, and the reaction mixture is reacted at a pH maintained at 6 until the consumption of sodium hydroxide solution has ceased (duration about 3 to 6 hours). Then the pH is adjusted to 1 with hydrochloric acid, and the product is salted out with sodium chloride. Filtering off and drying gives the compound of the formula

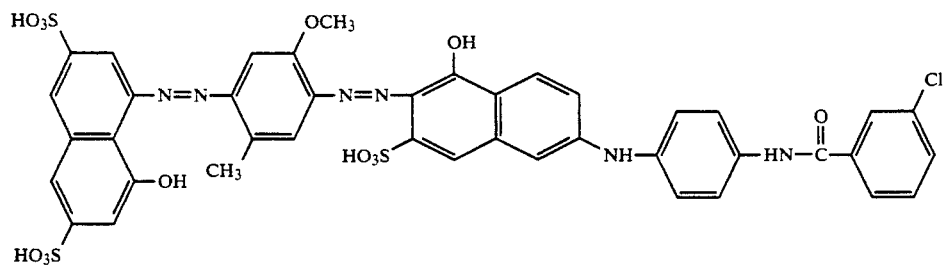

which dyes cotton in a blue shade having good general use fastness properties.

EXAMPLES 3 TO 17

The procedure of Examples 1 and 2 can be employed to prepare the compounds of the formula

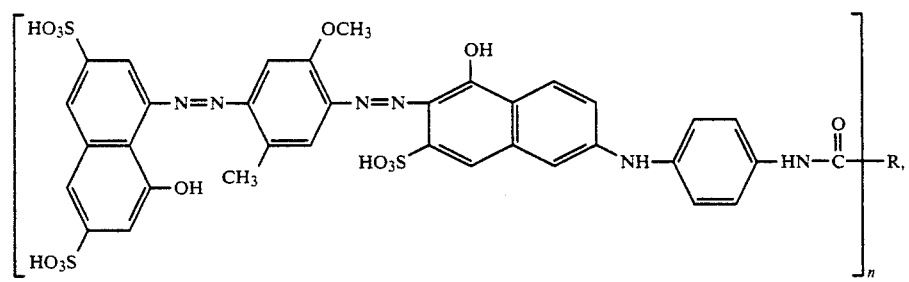

where R and n are each as defined in Table 1:

TABLE 1

| Example No. | n | R |
|---|---|---|
| 3 | 1 | phenyl |
| 4 | 1 | 4-chlorophenyl |
| 5 | 1 | 2-chlorophenyl |
| 6 | 2 | 1,4-phenylene |
| 7 | 1 | 1-naphthyl |

TABLE 1-continued

| Example No. | n | R |
|---|---|---|
| 8 | 1 | 2-naphthyl |
| 9 | 1 | 2-thienyl |
| 10 | 2 | 2,5-thienylene |
| 11 | 1 | —OCH$_2$CH$_3$ |
| 12 | 1 | 4-fluorophenyl |
| 13 | 1 | 4-bromophenyl |
| 14 | 1 | 3-pyridyl |
| 15 | 2 | —CH=CH— |

TABLE 1-continued

| Example No. | n | R |
|---|---|---|
| 16 | 2 | 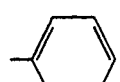 |
| 17 | 1 | 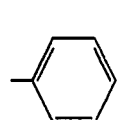 |

EXAMPLES 18 TO 31

The procedure of Examples 1 and 2 can be employed to prepare the compounds of the formula

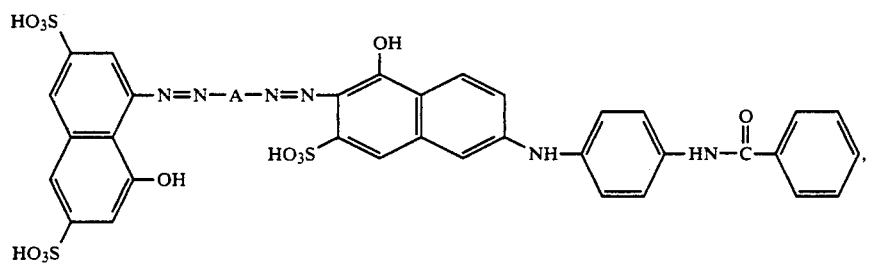

where A is as defined in Table 2:

TABLE 2

| Example No. | A |
|---|---|
| 18 |  |
| 19 | 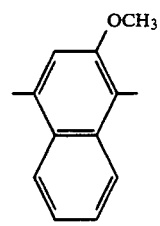 |
| 20 | 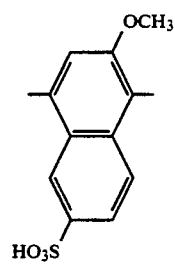 |
| 21 | 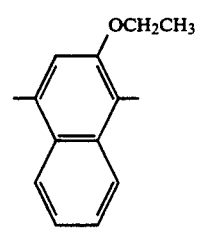 |

TABLE 2-continued

| Example No. | A |
|---|---|
| 22 | -CH2OH on methylphenyl) |
| 23 | ![](OCH3, NHCOCH3 substituted phenyl) |
| 24 | ![](NHCOCH3 substituted phenyl) |
| 25 | ![](OCH3 substituted naphthyl) |
| 26 | ![](OCH3, HO3S substituted naphthyl) |
| 27 | ![](OCH2CH3 substituted naphthyl) |

TABLE 2-continued
| Example No. | A |
|---|---|
| 28 | 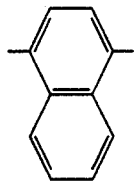 |
| 29 | 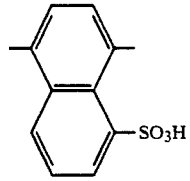 —SO₃H |
| 30 | 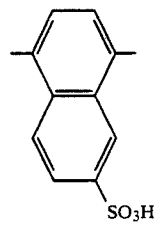 SO₃H |
| 31 | 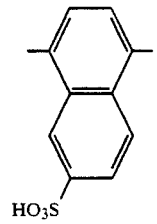 HO₃S |
EXAMPLES 32 TO 46
The procedure of Examples 1 and 2 can be employed to prepare the compounds of the formula
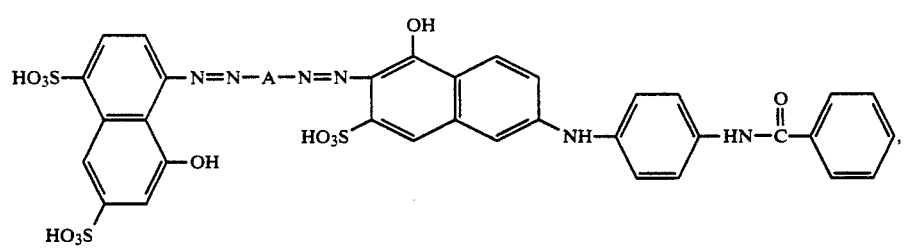
where A is as defined in Table 3:
TABLE 3
| Example No. | A |
|---|---|
| 32 | 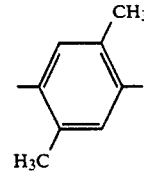 OCH₃ / H₃C |
TABLE 3-continued
| Example No. | A |
|---|---|
| 33 | 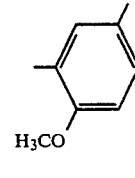 CH₃ / H₃C |
| 34 | 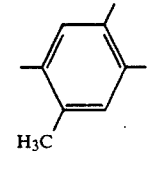 OCH₃ / H₃CO |
| 35 | 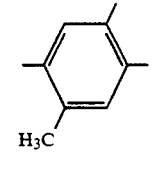 OCH₂CH₂OH / H₃C |
| 36 | 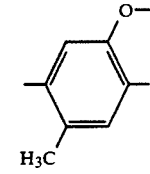 O—CH₂—CH(CH₃)—OH / H₃C |
| 37 | 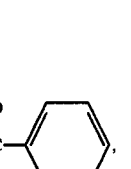 O—CH₂—CH(OH)—CH₂OH / H₃C |
| 38 |  OCH₃ / NHCOCH₃ |
| 39 | 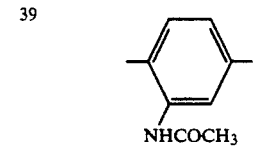 NHCOCH₃ |

TABLE 3-continued

| Example No. | A |
|---|---|
| 40 | 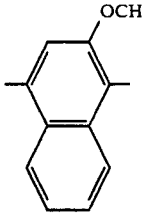 |
| 41 | 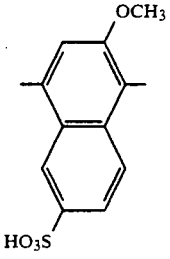 |
| 42 | 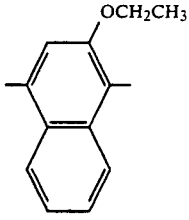 |
| 43 | 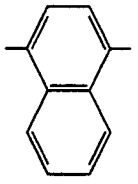 |
| 44 | 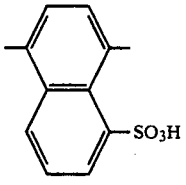 |
| 45 | 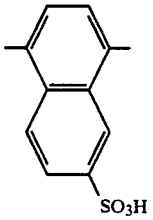 |
| 46 | 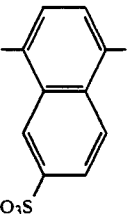 |

EXAMPLES 47 TO 49

The procedure of Examples 1 and 2 can be employed to prepare the compounds of the formula

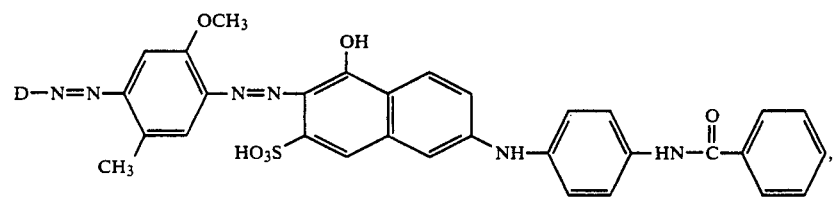

where D is as defined in Table 4:

TABLE 4

| Example No. | D |
|---|---|
| 47 | 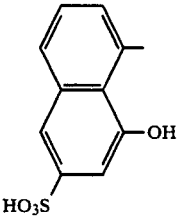 |
| 48 | 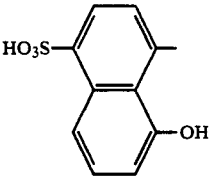 |
| 49 | 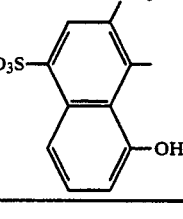 |

EXAMPLE 50 a) 21.75 parts of 6-(4'-aminophenylamino)-1-hydroxynaphthalene-3-sulfonic acid (75.9%) are suspended in 3 parts of sodium acetate and 500 parts of water, heated to 55° C. and stirred until dissolved. A pH of 7.6 is set by adding 4N sodium hydroxide solution. This pH of 7.6 is maintained at a temperature of 40° C. while 5.85 parts of chloroformic acid are added dropwise in the course of 15 minutes. The reaction has ended after about 1 hour, giving a solution which contains the compound of the formula

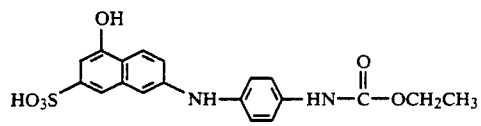

b) 31.6 parts of the compound of the formula

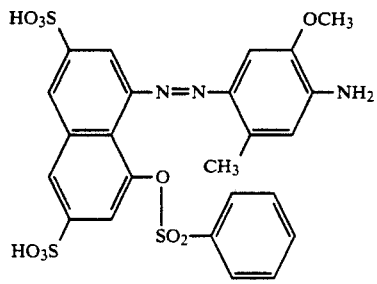

(9)

are diazotised with sodium nitrite and hydrochloric acid in a conventional manner and the resulting diazo suspension is added dropwise at 0° to 5° C. to the suspension obtained as per a), in the course of about 30 minutes, during which the coupling pH is kept constant at about 8.5 by the addition of sodium hydroxide solution. The reaction mixture is stirred at pH 8.5 for about 8 to 15 hours and then brought to pH 12 to 13 with sodium hydroxide solution. The reaction mixture is then stirred at a temperature of 85° to 90° C. for about 2.5 hours and then cooled down to room temperature, and the resulting solution is adjusted to pH 6.5 to 7 with concentrated HCl. The compound of the formula

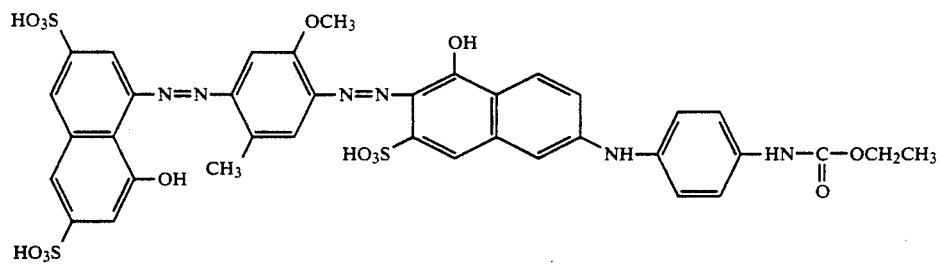

is then salted out with sodium chloride, filtered off and dried.

EXAMPLE 51

16.5 parts of 6-(4'-aminophenylamino)-1-hydroxynaphthalene-3-sulfonic acid are dissolved in 1500 parts of hot water. After cooling down to room temperature, 9.65 parts of 4-chlorobenzoyl chloride are added dropwise in the course of about 30 minutes and the reaction mixture is reacted at a pH maintained at 6 until the consumption of sodium hydroxide solution has ceased (duration about 2.5 to 4 hours). Then the pH is adjusted to 1 with hydrochloric acid and the product is salted out with sodium chloride. Filtering off with suction and drying gives the compound of the formula

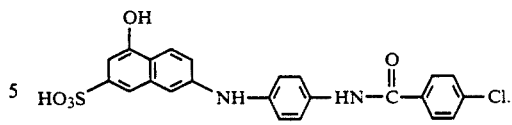

The replacement of 4-chlorobenzoyl chloride with an equivalent amount of benzoyl chloride or 3-chlorobenzoyl chloride gives analogous intermediates.

Dyeing example: 12.5 parts of an unmercerised, unbleached cotton fabric are wetted out at a temperature of 80° C. with one part of a nonionic wetting agent. The cotton fabric is squeezed off and introduced at a liquor ratio of 20:1 into a 50° C. dye solution containing 1.0% of the dye obtained as per Example 3. The dyebath is heated over 30 minutes to the boil, 15 g/l of sodium sulfate are added in three portions, and the dyebath is left at the boil for 45 minutes. The dyed cotton fabric is then removed from the bath. Rinsing with cold water and drying leaves the cotton fabric dyed in a blue shade which has good general use fastness properties.

What is claimed is:

1. A compound of the formula

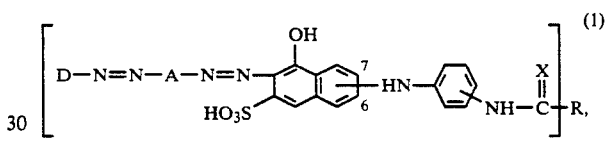

(1)

where
D is an 8-hydroxy-1-naphthyl radical which is substituted by 1 or 2 sulfo groups,
A is a radical of the formula

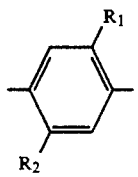

(2)

or of the formula

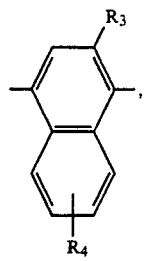

where $R_1$ and $R_2$ are each independently of one another hydrogen, $C_1$–$C_4$alkyl, unsubstituted or hydroxyl-substituted (in the alkyl moiety) $C_1$–$C_4$alkoxy or $C_2$–$C_4$alkanoylamino, unsubstituted or $C_1$–$C_4$alkyl-, $C_1$–$C_4$alkoxy- or halogen-substituted benzoylamino or ureido, $R_3$ is hydrogen, $C_1$–$C_4$alkyl or $C_1$–$C_4$alkoxy, and $R_4$ is hydrogen or sulfo, and the phenylene radical (B) is unsubstituted or halogen-, $C_1$–$C_4$alkyl- or $C_1$–$C_4$alkoxy-substituted, X is S or O,
n is 1 or 2, and
R, for n being 1, is substituted or unsubstituted alkyl, alkoxy, cycloalkyl, alkenyl, aryl, aralkyl or hetaryl or, for n being 2, is substituted or unsubstituted alkylene, cycloalkylene, alkenylene, arylene, aralkylene or heterocyclylene.

2. A compound according to claim 1, wherein D is 8-hydroxy-3,6-disulfo-1-naphthyl, 8-hydroxy-4,6-disulfo-1-naphthyl, 8-hydroxy-2,4-disulfo-1-naphthyl, 8-hydroxy-3,5-disulfo-1-naphthyl, 8-hydroxy-4,7-disulfo-1-naphthyl, 8-hydroxy-5,7-disulfo-1-naphthyl, 8-hydroxy-4-sulfo-1-naphthyl, 8-hydroxy-5-sulfo-1-naphthyl or 8-hydroxy-6-sulfo-1-naphthyl.

3. A compound according to claim 1, wherein D is 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, preferably 8-hydroxy-3,6-disulfo-1-naphthyl.

4. A compound according to claim 1, wherein A is a radical of the formula (2) where $R_1$ and $R_2$ are each independently of one another hydrogen, methyl, ethyl, methoxy, ethoxy, acetylamino, hydroxyacetylamino, n-propionylamino, benzoylamino or ureido or a radical of the formula (3) where $R_3$ is hydrogen, methyl or methoxy and $R_4$ is sulfo.

5. A compound according to claim 1, wherein A is a radical of the formula (2) where $R_1$ is methyl or methoxy and $R_2$ is hydrogen, methyl, methoxy, acetylamino or ureido.

6. A compound according to claim 1, wherein A is the radical of 1-amino-2-methoxy-5-methylbenzene.

7. A compound according to claim 1, wherein the phenylene radical B is unsubstituted or chlorine-, methyl- or methoxy-substituted.

8. A compound according to claim 1, wherein the bracketed radical in formula (1) conforms to the formula

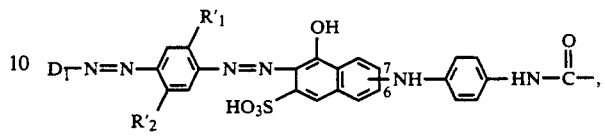

where $D_1$ is 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, $R'_1$ is methyl or methoxy and $R'_2$ is hydrogen, methyl, methoxy, acetylamino or ureido.

9. A compound according to claim 1, wherein the bracketed radical in the formula (1) conforms to the formula

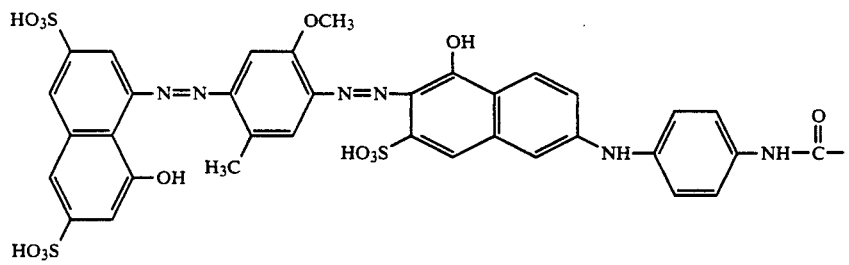

10. A compound according to claim 1, wherein n is 1 and R is $C_1$–$C_4$alkyl, $C_1$–$C_4$alkoxy, unsubstituted or methyl-monosubstituted, -disubstituted or -trisubstituted cyclopentyl or cyclohexyl, unsubstituted or nitro-, chlorine-, bromine-, methyl-, methoxy-, N,N-dimethylamino-, N,N-diethylamino-, acetylamino-, propionylamino-, benzoylamino-, methoxycarbonyl-, ethoxycarbonyl- or methylsulfonyl-substituted phenyl, unsubstituted or nitro- or chlorine-substituted 1- or 2-naphthyl, unsubstituted or methyl-, methoxy- and/or chlorine-substituted benzyl, or 2-thiophenyl, 2-furanyl or 2-, 3- or 4-pyridinyl.

11. A compound according to claim 1, wherein n is 1 and R is methyl, ethyl, unsubstituted or nitro-, chlorine-, methyl- and/or methoxy-substituted phenyl, 2-thiophenyl, benzyl or 1- or 2-naphthyl or phenyl, o-, m- or p-chlorophenyl or 1- or 2-naphthyl.

12. A compound according to claim 1, wherein n is 2 and R is an unsubstituted or methoxy-substituted $C_2$–$C_4$alkylene radical, an unsubstituted or methyl-monosubstituted, -disubstituted or -trisubstituted cyclohexylene radical, trans-CH=CH—, an unsubstituted or methyl- or methoxy-substituted 1,3- or 1,4-phenylene radical, a $C_1$–$C_3$alkylene-phenylene or $C_1$–$C_2$alkylene-phenylene-$C_1$–$C_2$alkylene radical where phenylene is in each case unsubstituted or methyl-, methoxy- or chlorine-substituted, or 1,4-piperazinediyl, 2,5-furandiyl or 2,5-thiophenediyl.

13. A compound according to claim 1, wherein n is 2 and R is 1,3- or 1,4-phenylene, 2,5-thiophenediyl, 1,4-piperazinediyl or trans-CH=CH—.

14. A compound according to claim 1 of the formula (1) where D is 8-hydroxy-3,6-disulfo-1-naphthyl-, 8-hydroxy-4,6-disulfo-1-naphthyl, 8-hydroxy-2,4-disulfo- 1-naphthyl, 8-hydroxy-3,5-disulfo-1-naphthyl, 8-hydroxy-4,7-disulfo-1-naphthyl, 8-hydroxy-5,7-disulfo-1-naphthyl, 8-hydroxy-4-sulfo-1-naphthyl, 8-hydroxy-5-sulfo-1-naphthyl or 8-hydroxy-6-sulfo-1-naphthyl, A is a radical of the aforementioned formula (2) where $R_1$ and $R_2$ are each independently of one another hydrogen, methyl, ethyl, methoxy, ethoxy, acetylamino, hydroxyacetylamino, n-propionylamino, benzoylamino or ureido or a radical of the aforementioned formula (3) where $R_3$ is hydrogen, methyl or methoxy and $R_4$ is sulfo, B is unsubstituted or chlorine-, methyl-, ethyl-, methoxy- or ethoxy-substituted phenylene, X is O and n is 1 or 2 and where R, for n being 1, is $C_1$-$C_4$alkyl, $C_1$-$C_4$alkoxy, unsubstituted or methyl-monosubstituted, -disubstituted or -trisubstituted cyclopentyl or cyclohexyl, unsubstituted or a nitro-, chlorine-, bromine-, methyl-, methoxy-, N,N-dimethylamino-, N,N-diethylamino-, acetylamino-, propionylamino-, benzoylamino-, methoxycarbonyl-, ethoxycarbonyl- or methylsulfonyl-substituted phenyl, unsubstituted or nitro- or chlorine-substituted 1- or 2-naphthyl, unsubstituted or methyl-, methoxy- and/or chlorine-substituted benzyl, or 2-thiophenyl, 2-furanyl or 2-, 3- or 4-pyridinyl, or, for n being 2, is an unsubstituted or methoxy-substituted $C_2$-$C_4$alkylene radical, an unsubstituted or methyl-monosubstituted, -disubstituted or -trisubstituted cyclohexylene radical, trans-CH=CH—, an unsubstituted or methyl- or methoxy-substituted 1,3- or 1,4-phenylene radical, a $C_1$-$C_3$alkylene-phenylene or $C_1$-$C_2$alkylene-phenylene-$C_1$-$C_2$alkylene radical where phenylene is in each case unsubstituted or methyl-, methoxy- or chlorine-substituted, or 1,4-piperazinediyl, 2,5-furandiyl or 2,5-thiophenediyl.

15. A compound according to claim 1 of the formula

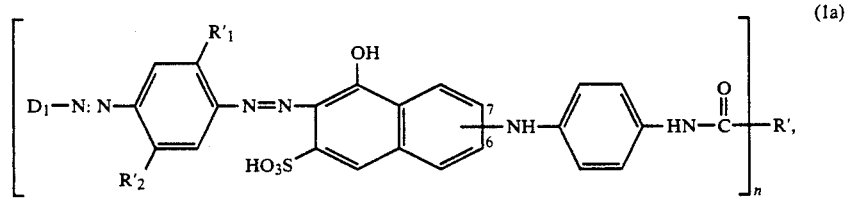

(1a)

where $D_1$ is 8-hydroxy-3,6-disulfo-1-naphthyl, 8-hydroxy-4,6-disulfo-1-naphthyl, 8-hydroxy-2,4-disulfo-1-naphthyl or 8-hydroxy-4-sulfo-1-naphthyl, $R'_1$ is methyl or methoxy, $R'_2$ is hydrogen, methyl, methoxy, acetylamino or ureido, and n is 1 or 2 and where R', for n being 1, is methyl, ethyl, unsubstituted or nitro-, chlorine-, methyl- and/or methoxy-substituted phenyl, 2-thiophenyl, benzyl or 1- or 2-naphthyl or, for n being 2, is 1,3- or 1,4-phenylene, 2,5-thiophenediyl, 1,4-piperazinediyl or trans-CH=CH—.

16. A compound according to claim 1 of the formula

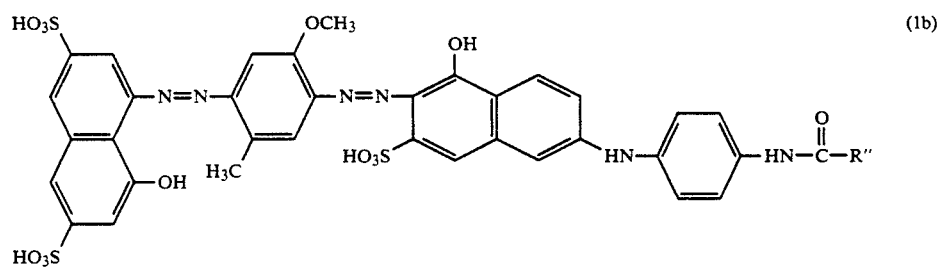

(1b)

where R'' is phenyl, o-, m- or p-chlorophenyl or 1- or 2-naphthyl.

17. A process for dyeing polyester-cotton blend fabrics with disperse and direct dyes, which comprises using, as well as disperse dyes, compounds of the formula (1) according to claim 1 as dyes in a single-stage, single-bath process and dyeing from an aqueous liquor at temperatures within the range from 100° to 150° C. and at a pH between 4 and 7.5.

18. The process according to claim 17, wherein the temperatures are within the range from 120° to 130° C.

* * * * *